United States Patent
Dawson et al.

(10) Patent No.: US 9,920,710 B2
(45) Date of Patent: Mar. 20, 2018

(54) MULTI-NOZZLE FLOW DIVERTER FOR JET ENGINE

(71) Applicant: GENERAL ELECTRIC COMPANY, Schenectady, NY (US)

(72) Inventors: David Lynn Dawson, Liberty Township, OH (US); Erin Lee Lariviere, Milford, OH (US); Brian Joseph Petersen, Mason, OH (US); Robert Jerome Ellerhorst, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 659 days.

(21) Appl. No.: 13/888,967

(22) Filed: May 7, 2013

(65) Prior Publication Data
US 2014/0345253 A1 Nov. 27, 2014

(51) Int. Cl.
| F02K 3/077 | (2006.01) |
| F02K 3/02 | (2006.01) |
| F02K 3/075 | (2006.01) |
| F02C 6/08 | (2006.01) |
| F02K 3/06 | (2006.01) |
| F02K 1/82 | (2006.01) |

(52) U.S. Cl.
CPC .............. *F02K 3/077* (2013.01); *F02C 6/08* (2013.01); *F02K 1/822* (2013.01); *F02K 3/025* (2013.01); *F02K 3/06* (2013.01); *F02K 3/075* (2013.01); *Y02T 50/675* (2013.01)

(58) Field of Classification Search
CPC . F02K 3/06; F02K 3/077; F02K 3/025; F02K 3/075; F02C 6/08

USPC ................... 60/785, 248, 262, 226.1, 226.3
See application file for complete search history.

(56) References Cited

U.S. PATENT DOCUMENTS

| 2,940,252 A | 6/1960 | Reinhart |
| 3,210,934 A | 10/1965 | Smale |

(Continued)

FOREIGN PATENT DOCUMENTS

| EP | 1895142 A2 | 3/2008 |
| EP | 1939437 A2 | 7/2008 |

OTHER PUBLICATIONS

International Search Report and Written Opinion issued in connection with corresponding PCT Application No. PCT/US2014/035497 on Feb. 11, 2015.

(Continued)

*Primary Examiner* — Steven Sutherland
(74) *Attorney, Agent, or Firm* — General Electric Company; William Scott Andes

(57) ABSTRACT

An exhaust system for a variable cycle aircraft engine. The exhaust system comprises a core exhaust for bypass air and hot gases of combustion. The core exhaust includes a convergent-divergent nozzle. The convergent-divergent nozzle is formed from a plurality of flaps and seals. The exhaust system comprises a third air duct for a third stream of air. The third stream of air is selectively exhausted from the third duct through a secondary nozzle or divergent slots in the convergent-divergent nozzle, or both depending upon the flight mode. A diverter valve is positioned in the third stream duct to selectively control the flow of third stream air through the secondary nozzle, the divergent slots and combinations thereof.

18 Claims, 8 Drawing Sheets

(56) References Cited

U.S. PATENT DOCUMENTS

| | | |
|---|---|---|
| 3,296,800 A | 1/1967 | Keenan et al. |
| 3,449,914 A | 6/1969 | Brown |
| 3,792,584 A | 2/1974 | Klees |
| 3,841,091 A | 10/1974 | Sargisson et al. |
| 3,854,286 A | 12/1974 | Klees |
| 3,879,941 A | 4/1975 | Sargisson |
| 3,886,737 A | 6/1975 | Grieb |
| 3,910,375 A | 10/1975 | Hache et al. |
| 3,915,413 A | 10/1975 | Sargisson |
| 3,970,252 A | 7/1976 | Smale et al. |
| 3,981,143 A | 9/1976 | Ross et al. |
| 3,990,638 A | 11/1976 | Johnson |
| 4,004,416 A | 1/1977 | Amelio et al. |
| 4,010,608 A | 3/1977 | Simmons |
| 4,026,472 A | 5/1977 | Rabone |
| 4,043,121 A | 8/1977 | Thomas et al. |
| 4,050,242 A | 9/1977 | Dusa |
| 4,064,692 A | 12/1977 | Johnson et al. |
| 4,066,214 A | 1/1978 | Johnson |
| 4,069,661 A | 1/1978 | Rundell et al. |
| 4,086,761 A | 5/1978 | Schaut et al. |
| 4,095,417 A | 6/1978 | Banthin |
| 4,136,518 A | 1/1979 | Hurley et al. |
| 4,214,441 A | 7/1980 | Mouritsen et al. |
| 4,290,262 A | 9/1981 | Wynosky et al. |
| 4,791,783 A | 12/1988 | Neitzel |
| 4,993,663 A | 2/1991 | Lahti et al. |
| 5,054,288 A | 10/1991 | Salemann |
| 5,058,617 A | 10/1991 | Stockman et al. |
| 5,074,118 A | 12/1991 | Kepler |
| 5,113,649 A * | 5/1992 | Siedlecki, Jr. ............ F02C 7/18 60/226.3 |
| 5,261,227 A | 11/1993 | Giffin, III |
| 5,402,638 A * | 4/1995 | Johnson ................. F02K 3/075 60/204 |
| 5,402,963 A | 4/1995 | Carey et al. |
| 5,404,713 A | 4/1995 | Johnson |
| 5,809,772 A * | 9/1998 | Giffin, III .............. F02K 3/075 60/226.1 |
| 6,502,383 B1 | 1/2003 | Janardan et al. |
| 7,134,271 B2 * | 11/2006 | Baughman ............. F01D 5/022 60/226.1 |
| 7,614,210 B2 | 11/2009 | Powell et al. |
| 7,758,303 B1 * | 7/2010 | Wadia .................... F01D 5/022 415/77 |
| 7,811,050 B2 * | 10/2010 | Roth ..................... F01D 17/162 415/116 |
| 7,926,290 B2 * | 4/2011 | Johnson ................. F02K 3/075 60/204 |
| 2005/0047942 A1 | 3/2005 | Grffin et al. |
| 2005/0126174 A1 | 6/2005 | Lair |
| 2005/0188676 A1 | 9/2005 | Lair |
| 2005/0204742 A1 | 9/2005 | Lair |
| 2007/0000232 A1 | 1/2007 | Powell et al. |
| 2008/0141655 A1 | 6/2008 | Johnson et al. |
| 2010/0107600 A1 | 5/2010 | Hillel et al. |
| 2012/0167549 A1 | 7/2012 | Lariviere et al. |

OTHER PUBLICATIONS

David Lynn Dawson et al., filed May 7, 2013, U.S. Appl. No. 13/889,003.

US Non-Final Office Action issued in connection with corresponding U.S. Appl. No. 13/889,003 dated Dec. 31, 2015.

US Final Office Action issued in connection with related U.S. Appl. No. 13/889,003 dated Jul. 27, 2016.

Chinese Office Action issued in connection with related CN Application No. 201480026254.9 dated Aug. 30, 2016.

* cited by examiner

MULTI-NOZZLE FLOW DIVERTER FOR JET ENGINE

CROSS-REFERENCE TO RELATED APPLICATIONS

This application is related to U.S. patent application Ser. No. 13/889,003, which was filed with the U.S. Patent and Trademark Office on even date as the present application and is incorporated herein by reference.

FIELD OF THE INVENTION

The present invention is directed to a three stream turbofan engine, and specifically to a diverter valve for a three stream turbofan engine.

BACKGROUND OF THE INVENTION

Most aircraft engines finding use in military applications, such as air combat, reconnaissance and surveillance, are augmented turbofans. Augmentation provides additional thrust for the aircraft when called upon, that is, on-demand.

All turbofan engines include at least two air streams. All air utilized by the engine initially passes through a fan, and then it is split into the two air streams. The inner air stream is referred to as core air and passes into the compressor portion of the engine, where it is compressed. This air then is fed to the combustor portion of the engine where it is mixed with fuel and the fuel is combusted. The combustion gases then are expanded through the turbine portion of the engine, which extracts energy from the hot combustion gases, the extracted energy being used to run the compressor and the fan and to produce electrical power to operate accessories. The remaining hot gases then flow into the exhaust portion of the engine, producing the thrust that provides forward motion to the aircraft.

The outer air flow stream bypasses the engine core and is pressurized by the fan. No other work is done on the outer air flow stream which continues axially down the engine but outside the core. The bypass air flow stream also can be used to accomplish aircraft cooling by the introduction of heat exchangers in the fan stream. Downstream of the turbine, the outer air flow stream is used to cool engine hardware in the exhaust system. When additional thrust is required (demanded), some of the fan bypass air flow stream is redirected to the augmenter where it is mixed with core flow and fuel to provide the additional thrust to move the aircraft.

At the rear of the exhaust, a convergent-divergent (C-D) nozzle sets the correct back pressure so that the core runs optimally. The C-D nozzle accomplishes this by choking the gas flow through the nozzle throat, A8, and varying A8 as required to set the required mass flow.

Certain variable cycle aircraft engines achieve relatively constant airflow as thrust is varied by changing the amount of fan bypass flow utilizing a third duct. Aircraft utilizing these variable cycle engines are able to maintain inlet airflow at subsonic power settings more efficiently and over a broader flight envelope. One particular type of variable cycle engine is referred to as a FLADE™ engine, FLADE™ being an acronym for "blade-on-fan" and is characterized by an outer fan duct which flows air into a third air duct, the outer fan duct being generally co-annular with, and circumscribing the inner fan duct, which in turn, is co-annular and circumscribes the core. This third airstream is pressurized by a blade-on-fan arrangement as set forth in prior art FLADE™ disclosures. The FLADE™ blades are radially outward of and directly connected to rotating fan blades, the fan blades assembled to a disk mounted on a shaft. The position of the FLADE™ is a design consideration, the design selected based on the temperature and pressure of the FLADE™ air (third stream air) desired. The trade-off is based on the fact that a higher pressure of FLADE™ operating air produces FLADE™ operating air with a higher temperature. U.S. Pat. No. 5,404,713 issued to Johnson on Apr. 11, 1995, assigned to the Assignee of the present invention and incorporated herein by reference.

In these variable cycle designs, the inlet air is split to form a third stream of air, which is in addition to the bypass and core. This third stream of air may be provided at a lower temperature and pressure than either the core air stream or the bypass air stream discussed above. The pressure of this third stream of air can be increased, while still maintaining it at a temperature and pressure below the bypass air stream, using the blade-on-fan or FLADE™ airfoil and duct. Prior art third stream air flows have been exhausted into the core exhaust either just fore or aft of the C-D nozzle. However, placement of heat exchangers within the third air stream in recent embodiments to take advantage of the low temperatures of the air flowing in the third stream duct or FLADE™ duct have resulted in pressure drops of the air in the third stream duct or FLADE™ duct. The changes in pressure by the introduction of heat exchangers have resulted in the inability to exhaust the third stream air into the core exhaust at conditions in which exhaust pressure is high, such as at high power operation, and the inlet pressure to the third stream is low, such as low Mach points. The result would be cessation of flow of air, or insufficient flow of air, in the third stream duct under these flight conditions, which could result in stagnation of air flow in the third stream duct and even backflow of gases (reversal of flow). Stagnation of the third stream air flow can lead to stall conditions on the blade-on-fan arrangement under certain circumstances, resulting in possible hardware damage and additional drag on the aircraft due to fan inlet spill drag.

What is needed is an arrangement in which the third stream duct air can be exhausted continuously so that there is no cessation or significant reduction of air flow in the third stream duct or in the FLADE™ duct at any operational conditions of the engine, as insufficient air flow could adversely affect cooling of heat exchangers or other hardware dependent on third stream air for cooling. Ideally, the third stream duct air flow should be exhausted to a low pressure region in a manner that will add thrust and operability to the aircraft.

BRIEF DESCRIPTION OF THE INVENTION

The aircraft turbofan engine of the present invention includes a fan portion that provides three streams of air flow to the engine. The engine utilizes three streams of air: the traditional core air flow, the traditional bypass air flow and a third stream or FLADE™ stream. A flow diverter valve is placed in a third duct to control the third air stream or FLADE™ stream. The flow diverter valve directs the third air stream or FLADE™ stream to either the primary nozzle or to a secondary nozzle or both, so that the third air stream may be exhausted. The diverter valve enables the third stream to be directed to the exhaust location where it is most useful for the circumstances being encountered. Thus, all FLADE™ stream air can be directed to a secondary nozzle to optimize thrust generation during cruise, improving specific fuel consumption (SFC). The exhaust of the secondary nozzle is almost always at a lower pressure than the pressure at A8 or just aft of A8 such that flow will constantly exhaust even at low third stream pressures. Alternatively, the diverter valve directs FLADE™ stream air to the primary nozzle when the pressure at A8 or just aft of A8 is lower to provide thrust and assist in cooling the divergent flaps and seals during augmentation and high speed cruise conditions, thereby extending the life of these parts. The diverter valve may also direct FLADE™ stream air simultaneously to both the primary and secondary nozzles, if desired, to balance system requirements and address potential flow limitations.

The exhaust of third stream or FLADE™ air allows the core to run at higher temperatures since the reliable supply of cooler third stream cooling air allows for protection of the turbine. Heat exchangers in the third stream can be used to reduce the temperature of the turbine cooling air and allow the turbine hardware to survive in the increased temperature environment.

Another advantage of the present invention is that cooling air from the third duct is made available to cool the divergent flaps and seals under augmentation as well as high speed cruise, when the exhaust temperatures are expected to be the highest.

Finally, the third duct or FLADE™ duct now can be relied upon not only to exhaust the cooler, low pressure third stream air or FLADE™ duct air continuously, but also to intake the air at the inlet. The third duct or FLADE™ duct now accepts much of the inlet wall distortion and minimizes the inlet distortion on the fan, the core or bypass air. This allows the fan and core/compressor to operate with less stall margin. When the fan and core operate at less stall margins, the engine can operate at higher pressure ratios, which translates into greater thrust and efficiency. Also, when the diverter valve directs flow to the secondary nozzle, the third stream duct or FLADE™ duct flow over the outer flaps additionally reduces boat tail drag while producing a more stable flow field over the outer flaps.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 4A depicts the active diverter valve configured to direct air flow to a secondary nozzle. FIG. 4B depicts the active diverter valve configured to split air flow to primary and secondary nozzles. FIG. 4C depicts the active diverter valve configured to direct air flow to the primary nozzle.

FIG. 6 depicts the passive diverter valve of FIG. 5 showing selectable exhaust flow paths.

DETAILED DESCRIPTION OF THE INVENTION

Figure 7:
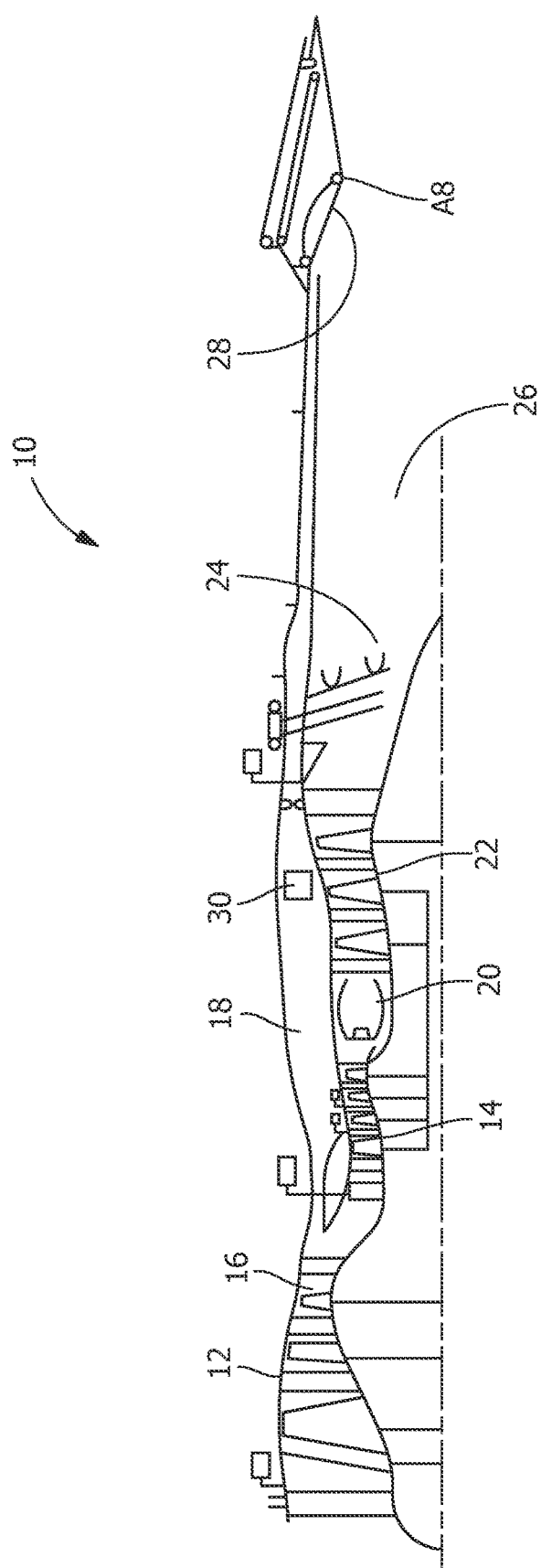
FIG. 7 is a cross section of a prior art turbofan engine having a core air stream and a bypass air stream.
Figure 8:
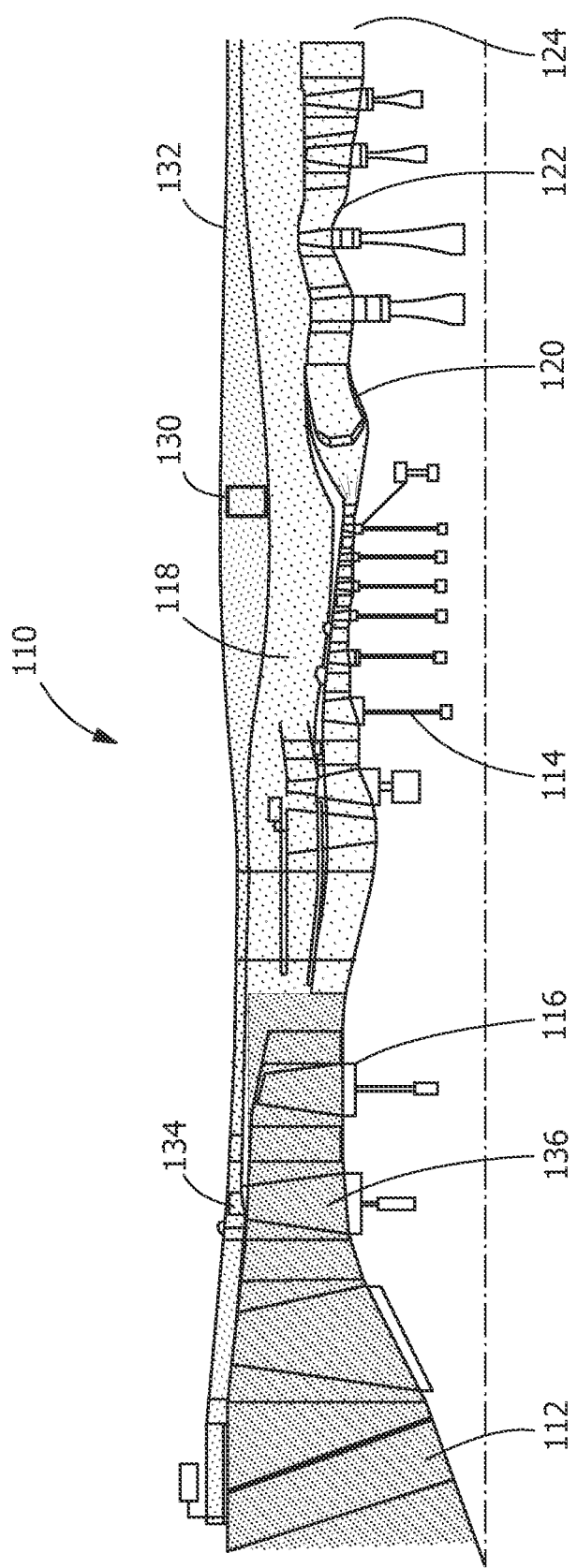
FIG. 8 is a cross section of a turbofan engine of the present invention having a core air stream, a bypass air stream and a FLADE™ or third air stream.

The differences between the turbofan of the present invention having the FLADE™ air stream and a conventional turbofan engine having two air streams can be appreciated with reference to FIG. 8, which depicts a turbofan that includes a FLADE™ duct and FIG. 7, which depicts a conventional turbofan engine. FLADE™ duct and third stream air duct, as well as FLADE™ airstream and third air stream may be used interchangeably herein, the differences between the two being the pathway that cooling air enters the duct. However, the structures and methods set forth herein are directed to exhausting air in the duct. Hence, the terms are used interchangeably.

In FIG. 7, air is drawn into engine 10 through a multi-stage fan portion 12. As depicted in FIG. 7, fan portion has three stages, although it will be understood that fan portion 12 may include more or less than three stages. Downstream of fan portion 12 is compressor portion 14. After the third fan stage 16, air is split between a bypass duct and compressor portion 14, core air being channeled to compressor portion 14 and bypass air being channeled to bypass duct 18.

Core air proceeds through the engine in the manner well known by those skilled in the art. Core air is fed from compressor portion 14 into combustor portion 20, where it is mixed with fuel and burned. The hot gases of combustion then flow to turbine portion 22 where the hot gases of combustion are expanded. An augmenter portion 24 resides aft of the turbine portion 22 and is available to provide additional power as needed, on demand, although it is not normally operational during cruise mode of flight. The augmenter portion 24 is positioned at the front of exhaust portion 26 of engine 10, which receives the hot gases of combustion as they exit turbine 22. At the aft of exhaust portion 26 is a nozzle 28, which is a convergent-divergent (C-D) nozzle. Hot gases passing through nozzle 28 provide thrust to move the aircraft forward. The minimum nozzle diameter is designated in FIG. 7 by A8.

Bypass air passing through bypass duct 18, as shown in FIG. 7 passes through heat exchangers 30 and along the exterior of exhaust portion 26 where it may be used to cool exhaust hardware. Bypass air is shown being diverted into bypass duct 18 aft of third fan stage 16, although it may be diverted at an earlier or later stage, depending on predetermined factors. In cruise mode, the bypass air flows to nozzle 28 where it exits and contributes to engine thrust. Under augmented flight mode, some of the bypass air is diverted into augmenter portion 24 where it is mixed with fuel and combusted for augmented flight.

Core and fan air in an augmented turbofan engine can be further split to form a third stream of air flowing through a third duct, which is sometimes referred to as a FLADE™ duct when the air is supplied to the third stream using a blade-on-fan arrangement. Alternately, the third stream may be bled from the fan at a fan stage fore or prior to the fan stage that provides bypass air, so that the third stream duct and its air supply are not referred to as a FLADE™ stream. Since the present invention is directed to exhausting air from the third duct, it is of no consequence whether the air in the third duct is sourced from a blade-on-fan arrangement or by diverting air flow from a fan stage fore of the source of bypass air. Any arrangement that utilizes a third duct 132 which bleeds air from the fan portion of the engine can be used in the present invention. The air that is bled to the third duct, or otherwise supplied to the third duct, must have a lower pressure and temperature than the air that is utilized as bypass air. This means that the third duct must be pressurized less than the bypass air. A convenient way of accomplishing this task is to bleed air or pressurize air from a fan stage that is fore of the fan stage used for bypass air, as this air will be at a lower temperature and pressure. As depicted in FIG. 8, for example, third duct air is pressurized by a blade-on-fan attachment 134 associated with the second fan stage 136, although air bled from second fan stage 136 would also be effective, while bypass air is pressurized by bleed air from third fan stage 116. Any other arrangement in which air supplied to third duct 132 is sourced from a fan stage that is fore of the fan stage for air supplied for bypass air will be effective. The selection of which stage air for third duct 132 is drawn is a trade-off, as higher fan stages provide air at higher temperatures and pressures. Higher temperatures adversely affect the cooling potential of the air in the third duct 132, while higher pressures expand the engine operational range at which third duct air can be provided to divergent slot.

FIG. 8, a cross-section of engine 110, depicts a FLADE™ arrangement in which third stream air enters the third duct at the fan portion of the engine. Core and bypass portions of the engines in FIGS. 7 and 8 operate in substantially the same way. Similar parts in both engines have the same last two digits for identification in FIGS. 7 and 8. The third duct in the FLADE™ arrangement and the air flowing through it are sealed from the core air and bypass air. The pressure of this third stream of air is increased using the blade-on-fan arrangement 134 of FLADE™ airfoil in the third duct 132. Inlet Guide Vanes (IGVs) assist in controlling the flow of air into FLADE™ duct 132. When the engine is operating under cruise and loiter conditions, the FLADE™ IGVs are rotated into a position to maximize the flow of air into the FLADE™ duct. Under high cruise conditions and augmentation, these physical settings are reversed, with the FLADE™ IGVs rotated into a position to minimize the air flow into the FLADE™ duct.

Prior art third stream air flows have been exhausted into the core exhaust either just fore or aft of the C-D nozzle. However, placement of the heat exchangers 130 as shown in FIG. 8 to take advantage of the low temperatures of the cooler air flowing in the third stream duct 132 or FLADE™ duct have resulted in pressure drops of the air in the third stream duct 132 or FLADE™ duct. The changes in pressure by the introduction of heat exchangers have resulted in the inability to exhaust the third stream air into the core exhaust under some conditions or at other typical third stream exhaust locations because the sink pressure at this location is too high. It has been discovered that when third stream air is exhausted at this location, there has been an unacceptable cessation of air flow in the third stream duct under some flight conditions.

In FIG. 8, in which the air flow forward of the augmentor is depicted, the air being drawn into FLADE™ duct 132 has its pressure increased by the operation of blade-on-fan attachment 134 located at second fan stage 136. The air in FLADE™ duct 132 is at a lower temperature and pressure than the air in bypass duct 118. As previously noted, third stream air may also be diverted into third stream duct 132 fore of the diversion of bypass air into bypass duct 118. This third air stream or FLADE™ stream has increased cooling capability and can be used to cool extensive electrical systems, to improve hardware durability and to reduce inlet distortion from the fan or engine core allowing the fan/core to run with less stall margin. However, the reduced pressure of the FLADE™ air stream keeps it from being introduced in the core/bypass air stream and being accelerated through the C-D nozzle at all flight conditions in a manner that would contribute to thrust. In such a configuration, when the reduced pressure of the FLADE™ air stream prevents flow into the C-D nozzle, air backs up in FLADE™ duct 132 thereby preventing FLADE™ air flow. In some circumstances, the backpressure is higher than the third stream pressure, resulting in flow reversal that can produce damage to components in communication with third duct 132. An alternate configuration that simply "dumps" the third stream air to the atmosphere at ambient pressure is not a desirable solution, as this imposes a serious penalty on both performance and efficiency.

Figure 1:
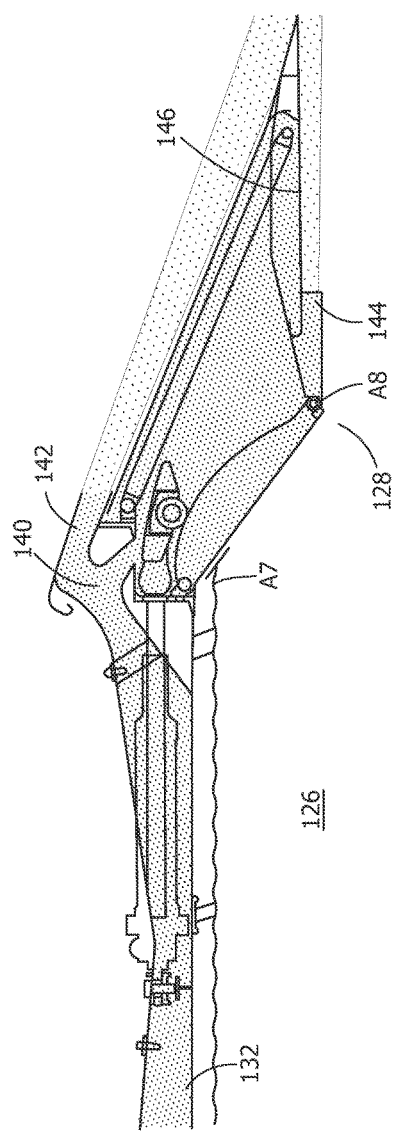
FIG. 1 depicts the cross section of an exhaust system of the present invention showing the position of a diverter valve and the exhaust flow paths for FLADE™ or third duct air flow.
Figure 2:
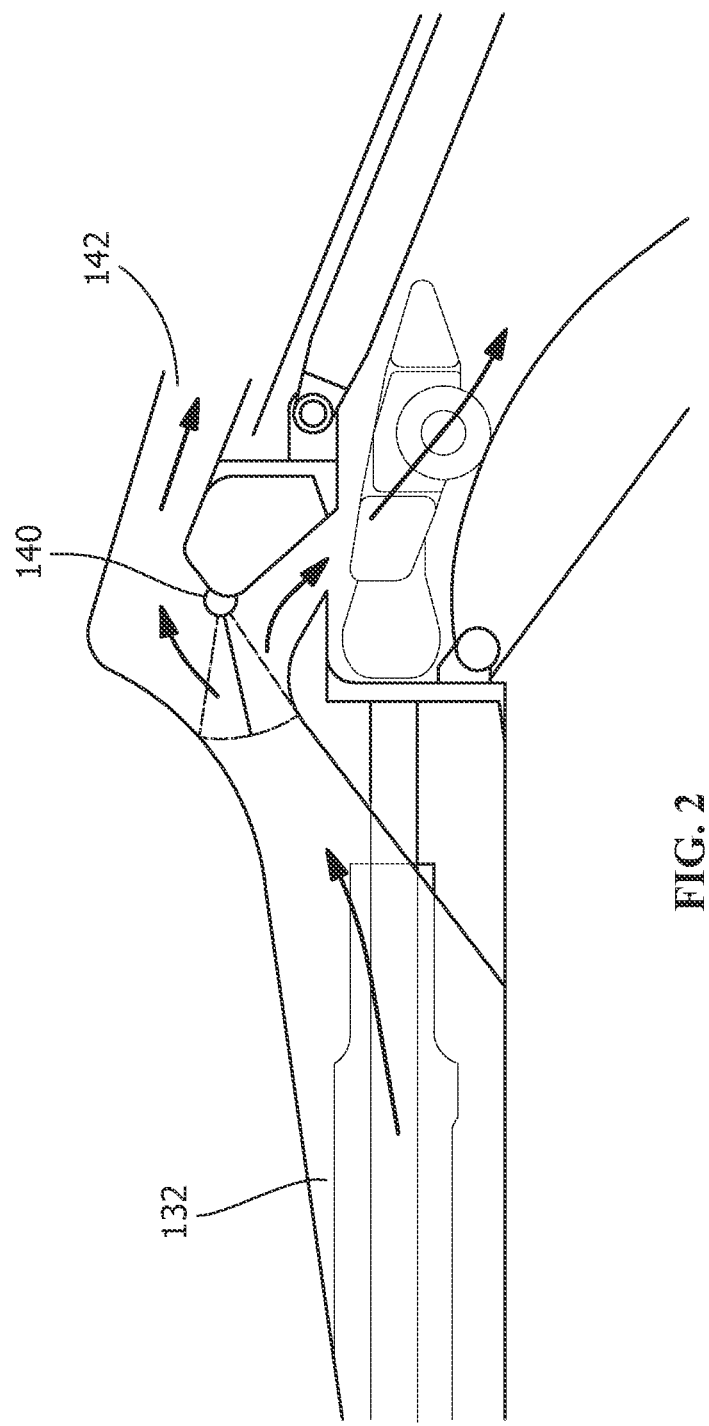
FIG. 2 depicts a diverter valve in a FLADE™ duct directing air flow to both to the primary nozzle along divergent slot and to the secondary nozzle.

The use of a diverter valve 140, as shown in FIG. 1, allows air flow from the third duct to be exhausted either into a secondary nozzle 142 or along divergent slot 144 into apertures between the convergent nozzle and the outer flaps and seals. The exhaust of FLADE™ air flow through diverter valve 140 into either secondary nozzle 142 or along divergent slot 144 is depicted in FIG. 2, and diverter valve location 140 is shown in FIG. 1. Diverter valve 140 preferably is positioned in the third duct or FLADE™ duct at or downstream of the axial location of A7, where A7 is the cross-sectional area at the upstream end of the convergent flaps and seals as shown in FIG. 1. A preferred location of the diverter valve is at location 140 as depicted in FIG. 1. However, the location of the diverter valve in any other location upstream or downstream of A7 may selectively direct air flow in third duct 132 to either secondary nozzle 142, divergent flaps and seals 146 or to some combination of the two with the inclusion of additional flow conduits, as required. As used herein, air flow through divergent slot means air flow exhausted through divergent slot 144 in the divergent flaps and seals 146.

Divergent slot 144 depicted in FIG. 1 acts as an ejector slot due to its positioning substantially parallel to the high velocity core stream. The high velocity gas in the core results in a low static pressure that assists in drawing flow of the third stream air through divergent slot 144. However, under certain conditions, the total pressure in the third stream is sufficiently low that the divergent slot will not be able to pass the required third stream flow despite the ejector effect. This may occur, for example, in some high power, low Mach flight conditions in which ram pressurization at the inlet is low, causing a low third stream total pressure. In this circumstance, diverter valve 140 allows air from the third stream duct 132 to flow through secondary nozzle 142. The air pressure at the exit of the secondary nozzle is at or below ambient pressure at all flight conditions, and therefore is lower than the pressure of air in the third duct 132. A positive flow of air through third duct 132 therefore can be obtained.

Figure 3:
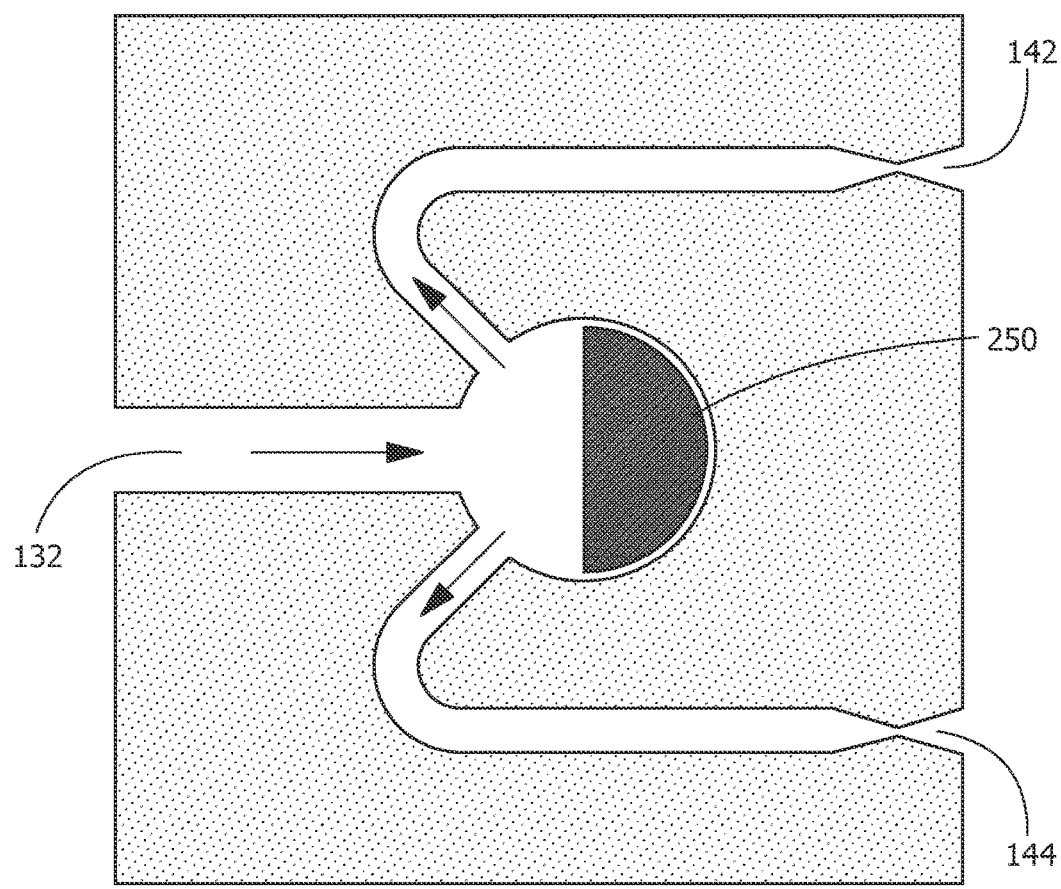
FIG. 3 depicts an active diverter valve.
Figure 4:
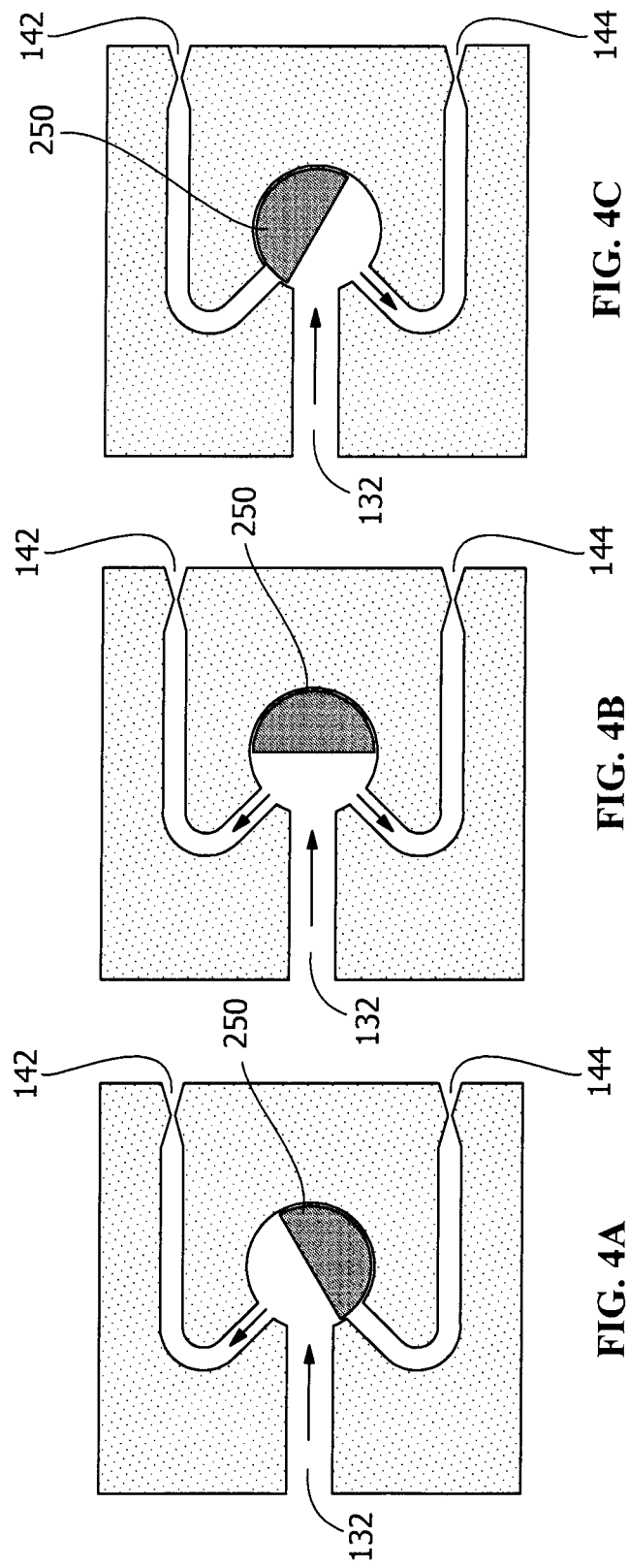
FIG. 4 depicts the active diverter valve of FIG. 3 showing selectable exhaust flow paths.

Diverter valve 140 may be any device that selectively directs the air flow to either secondary nozzle 142 or divergent slot 144. FIGS. 3 and 4 depict an active control valve 250 that directs air flow from the third duct to either the secondary nozzle 142 or the divergent slots in the primary nozzle 128, or both nozzles. FIG. 3 and in one embodiment of FIG. 4, diverter valve is configured to cause third duct air 132 to flow to both primary nozzle 128 through divergent slot 144 and to secondary nozzle 142. FIG. 4A also shows active control valve 250 configured to direct air flow from the third duct 132 to secondary nozzle 142 only, while FIG. 4C shows active control valve 250 configured to direct air flow from the third duct 132 to primary nozzle 128 through divergent slot only.

The flow of air through diverter valve 140 is dependent on engine operating conditions. The position of diverter valve 140 may be determined by sensors that measure the air pressure in third duct 132 and in primary nozzle at A8 or just aft of A8. An independent controller or a Full Authority Digital Engine Control (FADEC™), a complex controller for the aircraft engine, can analyze the readings and determine the proper position of diverter valve, when diverter valve 140 is an active valve.

Alternatively, the pressure of air through third duct 132 and at A8 or just aft of A8 can be measured during testing at different operating conditions and the proper position of diverter valve can be determined based on these measurements. The position of diverter valve 140 at these operating conditions can be programmed into the engine FADEC™, and the engine FADEC™ can instruct diverter valve 140 to move to the appropriate position to direct air to either the secondary nozzle, the divergent slot or both, based on the operating condition of the engine.

Figure 5:
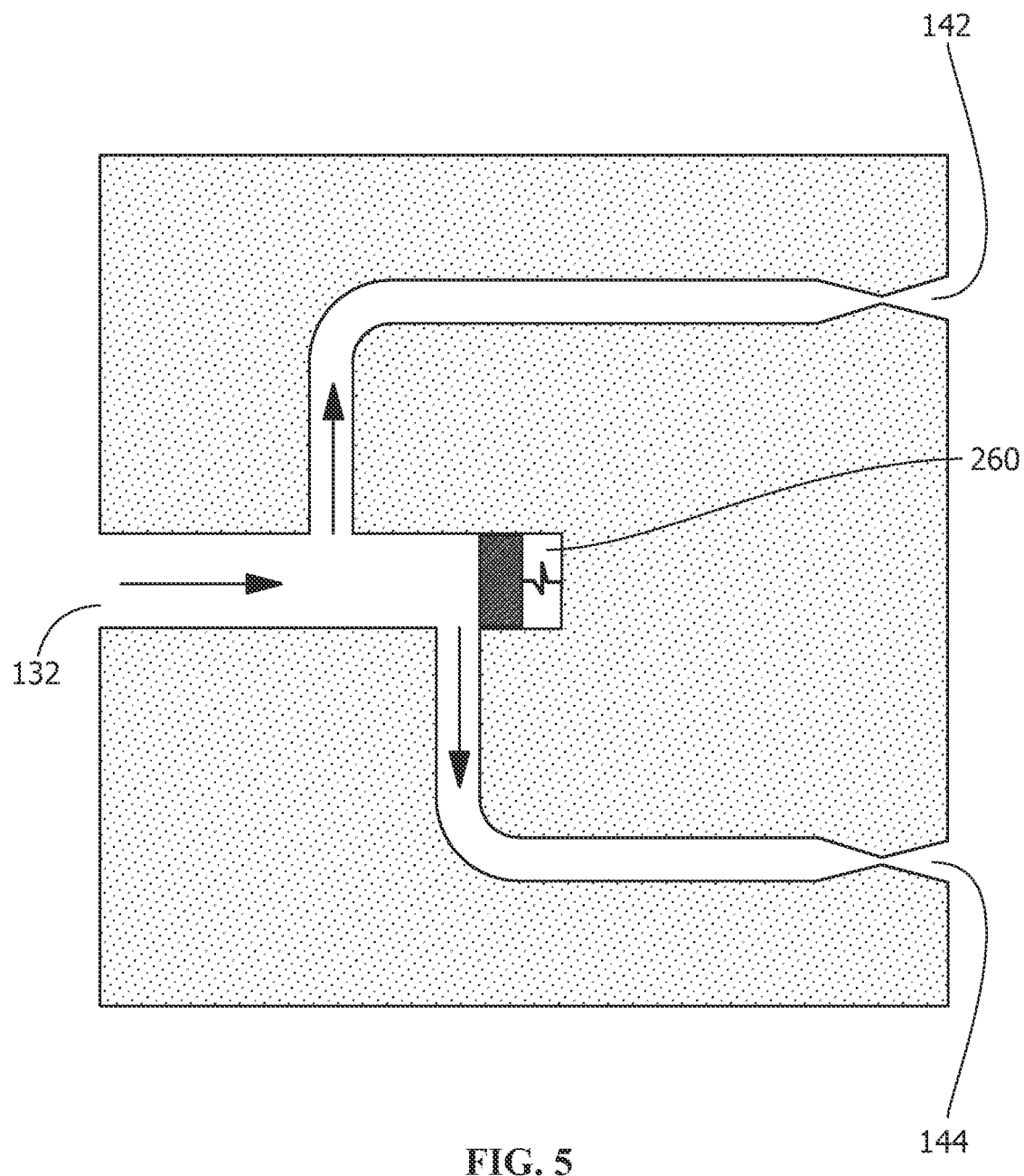
FIG. 5 depicts a passive diverter valve.

FIGS. 5 and 6 show a diverter valve as a passively controlled valve 260 that selectively directs the air flow to either secondary nozzle 142 or both the secondary nozzle and divergent slots 144. Diverter valve 140 is passive because its position is determined by the pressure of third stream air in third duct 132. At higher third stream pressure conditions such as high Mach flight points, the pressure in FLADE™ duct or third duct is higher than the mechanical force controlling diverter valve 140, so diverter valve 140 retracts. In lower third stream pressure conditions, the pressure in FLADE™ duct or third duct 132 is lower than the mechanical force on diverter valve 140, so the diverter valve moves into a position to block the air passageway to divergent slots 144 and hence primary nozzle 128. This position not only selectively channels air to secondary nozzle 142 but also prevents a backflow of core gases into FLADE™ duct or third duct 132.

Figure 6A:
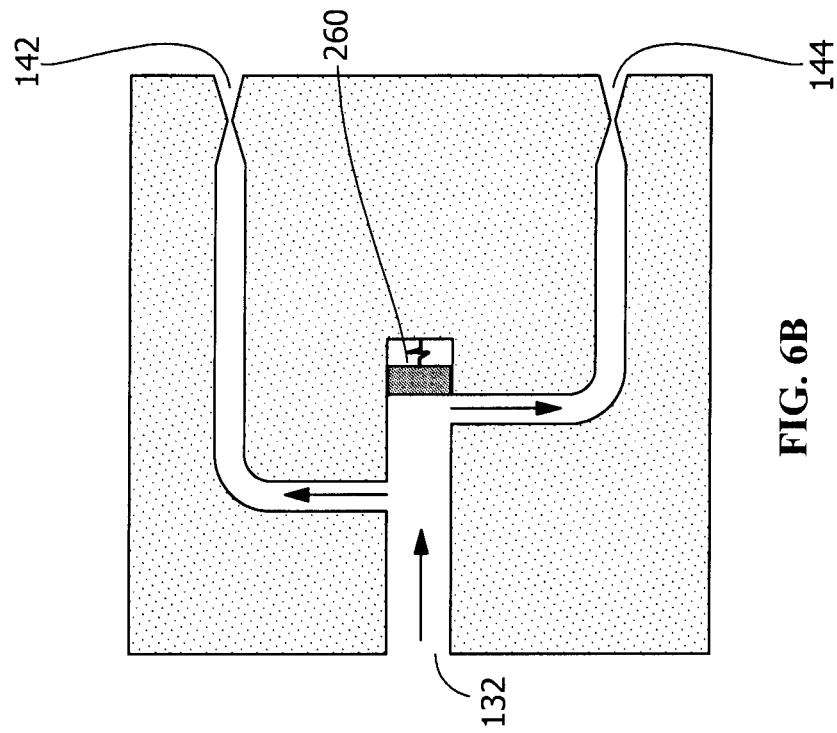
FIG. 6A depicts the passive diverter valve in a position to direct air flow only into a secondary nozzle.
Figure 6B:
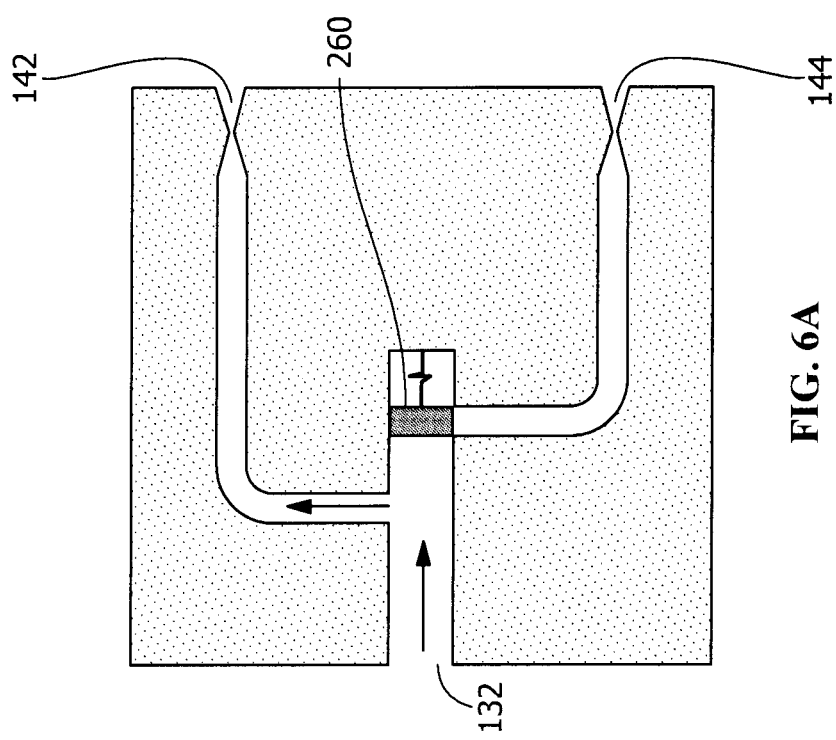
FIG. 6B depicts the passive diverter valve in a position to direct air flow into both a divergent slot and secondary nozzle.

In FIG. 5 and FIG. 6B, air flow in third duct 132 is sufficient to overcome the mechanical forces in diverter valve 140 and move diverter valve 140 into a position to cause third duct air 132 to flow to both primary nozzle 128 through divergent slot 144 and to secondary nozzle 142. FIG. 6A shows passive control valve 260 configured to direct air flow from the third duct 132 to secondary nozzle 142 only. As discussed above, when operating in a mode in which static pressure at A8 is greater than the total pressure in third duct 132, no air will flow through the divergent slot, and all the airflow will be directed through the diverter valve to secondary nozzle 142. However, when pressure at A8 is less than in third duct 132, air flow may be directed through passive valve 260 into both divergent slot 144 and into secondary nozzle 142 as shown in FIG. 6B.

The diverter valve may be located at any position in third stream duct 132. A most preferred location of diverter valve 140 is within third stream duct 132 adjacent to primary nozzle cross-section A7 where no additional plumbing is required to direct the flow of third stream air to either the primary or secondary nozzle. Diverter valve 140 may be located at other locations within third stream duct 132, although additional plumbing may be required for effective operation at these locations.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An aircraft turbofan engine, having a fan portion providing three streams of air flow to the aircraft turbofan engine, comprising:
an engine core receiving core air flow that is exhausted through a primary nozzle;
a bypass duct receiving bypass air flow; and
a third air duct receiving third stream air flow, the third stream airflow flowing through the third air duct, the third air duct having an air inlet and an air outlet, the air outlet of the third air duct further comprising a secondary nozzle, the primary nozzle and a flow diverter valve to direct the third stream air flow to at least one of the secondary nozzle or the primary nozzle, wherein the secondary nozzle is positioned to direct the third stream air flow over outer flaps of the primary nozzle.

2. The aircraft turbofan engine of claim 1 wherein the air outlet for third stream airflow that includes the primary nozzle further includes fluid communication between the flow diverter valve along divergent slots formed in divergent flaps and seals in the primary nozzle.

3. The aircraft turbofan engine of claim 1 wherein the flow diverter valve is a passive valve.

4. The aircraft turbofan engine of claim 3 wherein the flow diverter valve is biased into a first position by a pressure of the third stream air flow in the third air duct to provide fluid communication to the primary nozzle and to the secondary nozzle.

5. The aircraft turbofan engine of claim 4 wherein the flow of third stream air to the primary nozzle further provides cooling to divergent flaps and seals in the primary nozzle.

6. The aircraft turbofan engine of claim 3 wherein the flow diverter valve biases to a second position overcoming a pressure of the third stream air flow in the third air duct to block fluid communication between the third air duct and the primary nozzle, directing third stream air flow to the secondary nozzle only.

7. The aircraft turbofan engine of claim 6 wherein the flow diverter valve biases to the second position that blocks a backflow of hot gases from the primary nozzle into the third air duct.

8. The aircraft turbofan engine of claim 1 wherein the flow diverter valve is an active valve.

9. The aircraft turbofan engine of claim 8 wherein the flow diverter valve is in communication with a controller that determines and controls the position of the flow diverter valve.

10. The aircraft turbofan engine of claim 9 wherein the third air duct further includes pressure sensors monitoring an air pressure in communication with the controller.

11. The aircraft turbofan engine of claim 10 wherein the controller determines a first position of the flow diverter valve providing fluid communication to both the secondary nozzle and the primary nozzle when the air pressure within the third air duct exceeds a predetermined pressure.

12. The aircraft turbofan engine of claim 10 wherein the controller determines a second position of the flow diverter valve providing fluid communication to the secondary nozzle while blocking fluid communication to the primary nozzle when the air pressure within the third air duct is at or below a predetermined pressure.

13. The aircraft turbofan engine of claim 8 wherein the flow diverter valve is in communication with an engine FADEC.

14. The aircraft turbofan engine of claim 13 wherein the engine FADEC determines the position of the flow diverter valve based on operating conditions of the aircraft turbofan engine.

15. The aircraft turbofan engine of claim 1 wherein a pressure and temperature of the third stream air flow in the third air duct is at a lower pressure and temperature than a pressure and temperature of the bypass air flow.

16. The aircraft turbofan engine of claim 1 wherein the third stream air flow provided to the third air duct is from the fan portion of the aircraft turbofan engine fore of bypass air.

17. The aircraft turbofan engine of claim 1 wherein third stream air flow is provided to the third air duct by a blade-on-fan or FLADE™, the third stream air flow in the third air duct being sealed from the core air flow and the bypass air flow.

18. The aircraft turbofan engine of claim 1 wherein the flow diverter valve is located within the third air duct adjacent to primary nozzle cross section A7, where A7 is the cross-sectional area at an upstream end of convergent flaps and seals.

* * * * *